(No Model.)
L. C. BEEBE.
GAS GENERATING LAMP.
No. 290,200.    Patented Dec. 18, 1883.
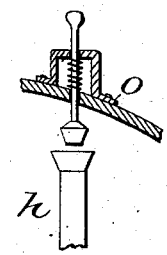
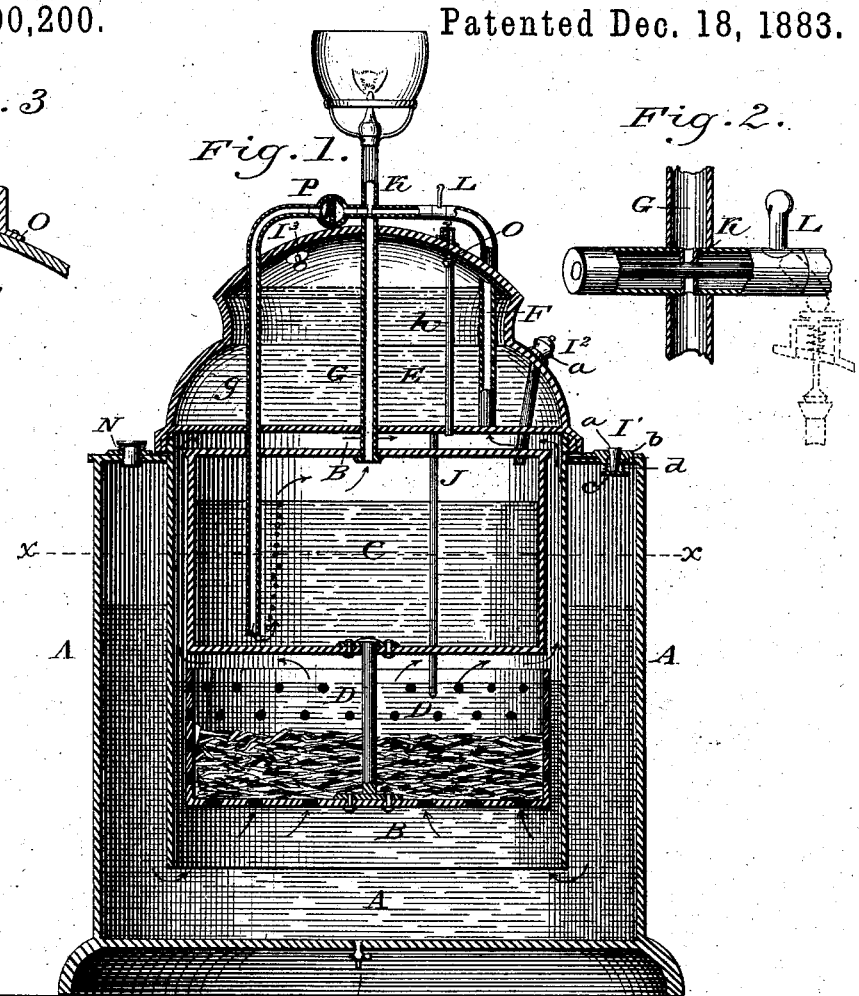
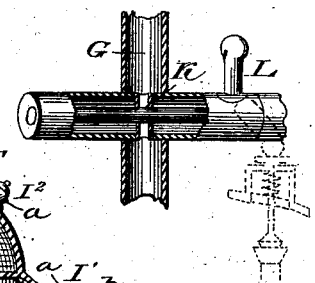
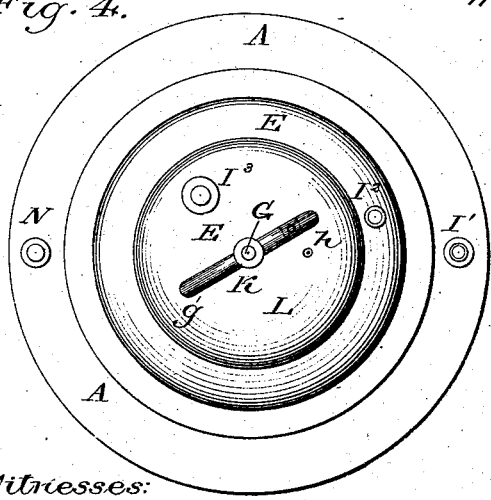
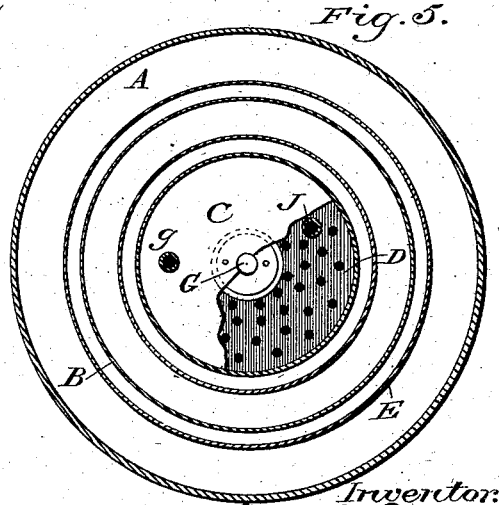
Witnesses:
Jas. F. Duhamel
Walter S. Dodge
Inventor:
Lyman C. Beebe,
by Dodge Son
Attys

UNITED STATES PATENT OFFICE.

LYMAN CHESTER BEEBE, OF VILLISCA, ASSIGNOR OF ONE-HALF TO R. TRUMAN, OF AFTON, IOWA.

GAS-GENERATING LAMP.

SPECIFICATION forming part of Letters Patent No. 290,200, dated December 18, 1883.

Application filed August 9, 1883. (No model.)

*To all whom it may concern:*

Be it known that I, LYMAN C. BEEBE, of Villisca, in the county of Montgomery and State of Iowa, have invented certain Improvements in Gas-Generating Lamps, of which the following is a specification.

My invention relates to self-generating gas-lamps—that is to say, lamps containing within themselves the generating apparatus; and the invention consists in a novel construction and arrangement of parts, whereby the apparatus is made to automatically regulate the quantity and pressure of the gas supplied.

In the accompanying drawings, Figure 1 represents a vertical sectional view of my improved apparatus; Figs. 2 and 3, detail views of the cut-off valves for stopping the action of the apparatus; Fig. 4, a top plan view, and Fig. 5 a horizontal section on the line $x\,x$ of Fig. 1.

Various attempts have hitherto been made to produce a simple, safe, and efficient apparatus for producing gas for domestic use; but such attempts have not generally been followed with success.

The apparatus which I am about to describe has been found in practice to possess all these qualities in an eminent degree, and, owing to its simplicity, it can be made at a very small cost.

A represents a vessel or chamber, which may advantageously be made of cylindrical form; and B, an inner chamber, the lower end of which is raised somewhat above the bottom of chamber A, so that the acidulated water supplied to the latter may rise into the chamber B.

C indicates a gasoline chamber or reservoir, and D a perforated cup or basket beneath the same to contain iron or zinc scraps or other material, which, acted upon by the acidulated water, will cause the hydrogen of the water to be liberated, the basket D being suspended from reservoir C, and this in turn from a removable chamber or vessel, E, which screws upon and forms a cover to the vessel A, as shown in Fig. 1, the vessel A being somewhat larger in diameter than the chamber or top E, and therefore affording room at the top for a supply or filling tube, I', and air-escape N.
Vessel E is supplied with water, which passes through a tube, J, with a small outlet to the basket or scrap-holder D, and, thus delivered in small quantity, it is decomposed, and its hydrogen is liberated to unite with the gas liberated from the acidulated water.

F indicates a tube opening out of the top of the chamber B, passing up through water-chamber E, and again downward by a leg or branch, $g$, through the same, and terminating within and near the bottom of the gasoline-reservoir C, so that the gas generated in the chamber B is caused to pass up through the gasoline and the vapor above it, and to become enriched by taking up a considerable amount thereof. From the upper part of the gasoline-reservoir the carbureted hydrogen passes up through tube G to the burner and is burned.

$I^2$ represents a capped filling-tube for supplying gasoline to chamber C, and $I^3$ represents a filling-tube for the reservoir or chamber E. Both of these inlets consist of a short conical tube, $a$, carried by a threaded collar, $b$, screwing into place in the tanks or vessels A and E, respectively, said tubes being open at each end, and provided at their inner ends each with a cap or plug, $c$, drawn against the end of the tube by springs $d$, made fast to the collar $b$. The filling-tube I' is thus made to act as an air-inlet when necessary, as presently explained. A small tube, $h$, opening out of the top of chamber B, rises nearly to the top of the water-chamber E, and terminates in a conical mouth to receive the plug of a spring-raised valve, O, when said valve is depressed. This pipe, which remains open while the apparatus is in use, serves to admit gas from chamber B to supply the space left by the discharge of water through pipe J. The stem of valve O projects above the vessel E, and stands directly in line with the handle L of a valve or cock, K, in the pipe G, where the pipe F passes through it, as shown in Fig. 2. By turning the valve-handle L down to a horizontal position it is caused not only to close valve K, but also to depress the stem of valve O and close the mouth of pipe $h$, and to close the passage through pipe F, thus by the one operation stopping the flow of gas to the gasoline-tank and the burner, and the entrance of gas to and consequently the flow of water from chamber E. A check-valve, P, in the downward branch or leg g of pipe F prevents an upward flow of gas therein, though permitting a free down-flow. The apparatus being thus constructed, water is supplied to tank E, gasoline to reservoir C, zinc clippings or other suitable scrap to basket D, and the vessel A is supplied with acidulated water to about two-thirds or three-quarters of its height. The acidulated water, coming into contact with the zinc or other matter in basket D, causes the decomposition of the water and the liberation of its hydrogen, a small quantity of which enters chamber or reservoir E through pipe h, permitting a limited amount of water to fall through tube J to the basket D, where its hydrogen is liberated, as mentioned. The gas flows through pipe F and down through leg or branch g thereof to near the bottom of gasoline-tank C, rising through the gasoline, and finally flowing through tube G to the burner, sufficiently enriched to burn with a bright, clear flame. If the gas should be produced more rapidly than it is consumed, it will shortly accumulate sufficient pressure to force down the acidulated water in chamber B to a level below the bottom of basket D, when of course the formation of gas will cease, the water rising and remaining in chamber A until the pressure is relieved. The air within chamber A escapes through vent N, and, when the acidulated water again falls, is permitted to re-enter through inlet I'.

I am aware that generators have before been constructed in such manner as to automatically control the supply or quantity of gas produced through the pressure of the gas within the generator, though the construction and arrangement of parts shown and described by me is believed to be new.

Having thus described my invention, what I claim is—

1. The herein-described gas-generating lamp, consisting of acidulated-water vessel A, gas-chamber B, open at its lower end, gasoline-chamber C, basket D, water-chamber E, and pipes F, g, h, and J, all combined and arranged to operate substantially as described.

2. In a gas-generator such as described and shown, the combination of a vessel, A, to contain acidulated water and provided with generating-chamber B, and a removable water-chamber, E, adapted to serve as a top or cover for vessel A, said water-chamber being provided with a gas-inlet pipe, h, opening from the generating-chamber into the water-chamber above the water-level, and an outlet-pipe, J, opening from the lower part of the water-chamber into the generating-chamber, whereby water is permitted to flow from the former into the latter just in proportion to the entrance of gas from the generating-chamber into the water-chamber.

3. In a gas-generating apparatus such as described, the combination of acidulated-water vessel A, generating-chamber B, water-vessel E, adapted to be secured upon the vessel A, and communicating with the generating-chamber by pipes h J, as shown, and the gasoline-vessel C and basket D, suspended from water-vessel E, whereby the water-vessel, gasoline-vessel, and basket may be removed together from the acidulated-water vessel A.

4. In a gas-generator substantially as described and shown, an acidulated-water vessel, a generating-chamber in communication therewith, and an inlet, I', and outlet N, communicating with the acidulated-water chamber, and adapted to open automatically to admit air into or permit its escape from the acidulated-water chamber as the water falls or rises therein.

5. In combination with vessel A, open-bottomed cylinder B, gasoline-tank C, and basket D, constructed and arranged substantially as shown and described, water-vessel E, provided with gas-inlet pipe h, valve O, and water-outlet pipe J.

6. The combination of acidulated-water vessel A, gas-vessel B, basket D, water-vessel E, provided with gas-inlet pipe h, valve O, and water-outlet J, and pipe F, provided with cock K and lever L, the latter arranged, substantially as shown and described, to depress the valve O in the act of closing cock K.

In testimony whereof I affix my signature in presence of two witnesses.

LYMAN CHESTER BEEBE.

Witnesses:
N. H. ANDRUS,
E. C. GIBBS.